United States Patent
Driessen et al.

(10) Patent No.: US 6,854,745 B2
(45) Date of Patent: Feb. 15, 2005

(54) BABY-CARRIAGE WITH STEERABLE WHEELS

(75) Inventors: Fransiscus Johannes Cornelus Driessen, Goirle (NL); Bart Willem Jozef Bost, Maastricht (NL)

(73) Assignee: Mutsy B.V., Goirle (NL)

( * ) Notice: Subject to any disclaimer, the term of this patent is extended or adjusted under 35 U.S.C. 154(b) by 0 days.

(21) Appl. No.: 10/333,843

(22) PCT Filed: Jul. 24, 2001

(86) PCT No.: PCT/NL01/00573

§ 371 (c)(1),
(2), (4) Date: Aug. 7, 2003

(87) PCT Pub. No.: WO02/14135

PCT Pub. Date: Feb. 21, 2002

(65) Prior Publication Data

US 2004/0021301 A1 Feb. 5, 2004

(30) Foreign Application Priority Data

Jul. 26, 2000 (NL) .............................................. 1015809
Apr. 27, 2001 (NL) .............................................. 1017961

(51) Int. Cl.⁷ ............................................... B62B 7/00
(52) U.S. Cl. ............... 280/47.38; 280/86; 280/124.122; 280/137.505
(58) Field of Search ........................... 280/47.38, 47.4, 280/642, 86, 124.122, 137.505

(56) References Cited

U.S. PATENT DOCUMENTS

| | | | | | |
|---|---|---|---|---|---|
| 11,369 | A | * | 7/1854 | Gibson | 280/98 |
| 1,057,479 | A | * | 4/1913 | Charter | 280/93.504 |
| D138,334 | S | * | 7/1944 | Hopkins | D12/129 |
| 2,694,437 | A | * | 11/1954 | Glaser | 280/657 |

FOREIGN PATENT DOCUMENTS

| | | |
|---|---|---|
| NL | 9400645 | * 12/1995 |
| WO | WO 99/02389 A | 1/1999 |
| WO | WO 00/34103 A | 6/2000 |

* cited by examiner

*Primary Examiner*—Bryan Fischmann
(74) *Attorney, Agent, or Firm*—Banner & Witcoff Ltd.

(57) ABSTRACT

A hand-propelled vehicle for passenger transport, in particular a pushchair, includes a chassis with at least three wheels, at least two of which are pivotally connected to the chassis, wherein the pivotable wheels are connected by at least one shaft which is pivotally connected to a fixed part of the chassis. The pivotable wheels are further situated behind the at least one fixed wheel as seen in the direction of travel of the vehicle, and the pivot connection of the shaft to the fixed part of the chassis is situated in front of the shaft as seen in the direction of travel. It is thus possible to arrange a steering function in frame constructions where there is no room for pivotable front wheels.

9 Claims, 4 Drawing Sheets

BABY-CARRIAGE WITH STEERABLE WHEELS

CROSS REFERENCE TO RELATED APPLICATIONS

This is a U.S. National Phase Application under 35 U.S.C. §371 and applicant herewith claims the benefit of priority of PCT/NL01/00573 filed Jul. 24, 2001, which was published Under PCT Article 21(2) in English, the entire contents of which are incorporated herein by reference, which claims priority to Dutch Application Nos. 1015809, filed Jul. 26, 2000, and 1017961, filed Apr. 27, 2001.

BACKGROUND OF THE INVENTION

The invention relates to a hand-propelled vehicle for passenger transport, in particular a pushchair, or perambulator comprising a chassis with at least three wheels, at least two of which are pivotally connected to the chassis.

Such a vehicle is generally known in the form of a pushchair, a buggy, a stroller or a wheelchair.

There are two types of pushchair, i.e. with relatively small solid wheels such as buggies, and with relatively large wheels with pneumatic tires such as strollers The latter type, which is marketed by applicant under the name Freerider, is becoming increasingly popular.

Pushchairs with small wheels are often provided is with steerable, or in fact co-steering wheels. These wheels are then embodied as castors and are generally arranged at the front of the pushchair.

The large wheels with pneumatic tires are generally not steerable since pivot-mounting of large wheels is more difficult, and a conventional pivot construction would be voluminous and expensive. A pivotally mounted wheel is furthermore not very stable during reverse movement of the vehicle.

SUMMARY OF THE INVENTION

The object of the invention is to provide a vehicle of the above described type which can be manufactured relatively simply and at low cost, and which in particular takes up little space in the folded-down position and which moreover has an excellent forward movement stability.

This object is achieved by such a vehicle wherein the pivotable wheels are connected by at least one shaft which is pivotally connected to the fixed part of the chassis.

Although the invention is intended in the first instance for pushchairs, it can also be applied to other hand-propelled vehicles, such as wheelchairs.

A better forward movement stability is obtained by placing the pivotable wheels together on a shaft.

According to another preferred embodiment the pivotable wheels are situated behind the at least one fixed wheel in the direction of travel of the vehicle, and the pivot connection of the shaft to the fixed part of the chassis is situated in front of the shaft as seen in the direction of travel.

This measure also results in an improved stability, especially during reverse travel.

According to a further preferred embodiment the distance between the pivot point and the shaft is in the order of magnitude of half the distance between the pivotable wheels.

Unexpectedly, this dimensioning measure also results in an increase in stability.

A specific preferred embodiment provides for the arranging of a rolling bearing in the pivot point.

The pivot point is after all heavily loaded. By providing a rolling bearing these loading forces can be absorbed well without this resulting in excessive wear.

Yet another preferred embodiment provides a slidable support bearing between the pivotable shaft and the pivot connection.

This support bearing also serves to absorb the great forces and moments which act on the pivot connection. By placing the support bearing at a considerable distance from the pivot point large moments can be absorbed with relatively small forces and pressures, thereby reducing wear.

An even more specific embodiment provides for the arranging of a rolling bearing in the support bearing, which support bearing is adapted to absorb at least a part of the normal force between the pivotable shaft and the pivot connection.

Tests have taught that the load on the support bearing proved to be greater than supposed. Pivoting can take place more easily through the arranging of rolling bearings, so that travel comfort is improved.

In order to further improve comfort and to increase the rigidity of the frame, the support bearing is provided with two rolling bearings, the axis of which encloses an angle which is greater than 30°.

According to yet another preferred embodiment the vehicle comprises friction-increasing means which comprise at least one friction member connected to the pivotable shaft or the fixed part of the chassis and engaging on the fixed part or the shaft.

The pivoting of the pivotable wheels hereby becomes subject to friction, so that with careful adjustment this measure also increases the stability. This would seem to conflict with the arrangement of rolling bearings in the support bearing, but the rolling bearings serve to absorb normal forces and to reduce wear, while the friction-increasing means serve to form a defined friction force during pivoting.

According to yet another preferred embodiment the vehicle comprises means for fixing the pivot connection in a determined position between the shaft and the fixed part of the chassis.

The pivoting of the wheels is blocked with these measures, so that a carriage is obtained with the travel performance of a classic pushchair. It is self-evident however that for this purpose the pivoting means must be fixed in the pivot position.

According to yet another preferred embodiment the fixation means comprise at least one movable blocking member connected to the pivotable shaft or the fixed part of the chassis and co-acting with the fixed part or the pivotable shaft, which member is biased to its blocking position.

BRIEF DESCRIPTION OF THE DRAWINGS

The present invention will be elucidated hereinbelow with reference to the annexed figures, in which.

DETAILED DESCRIPTION OF THE INVENTION

Figure 1:
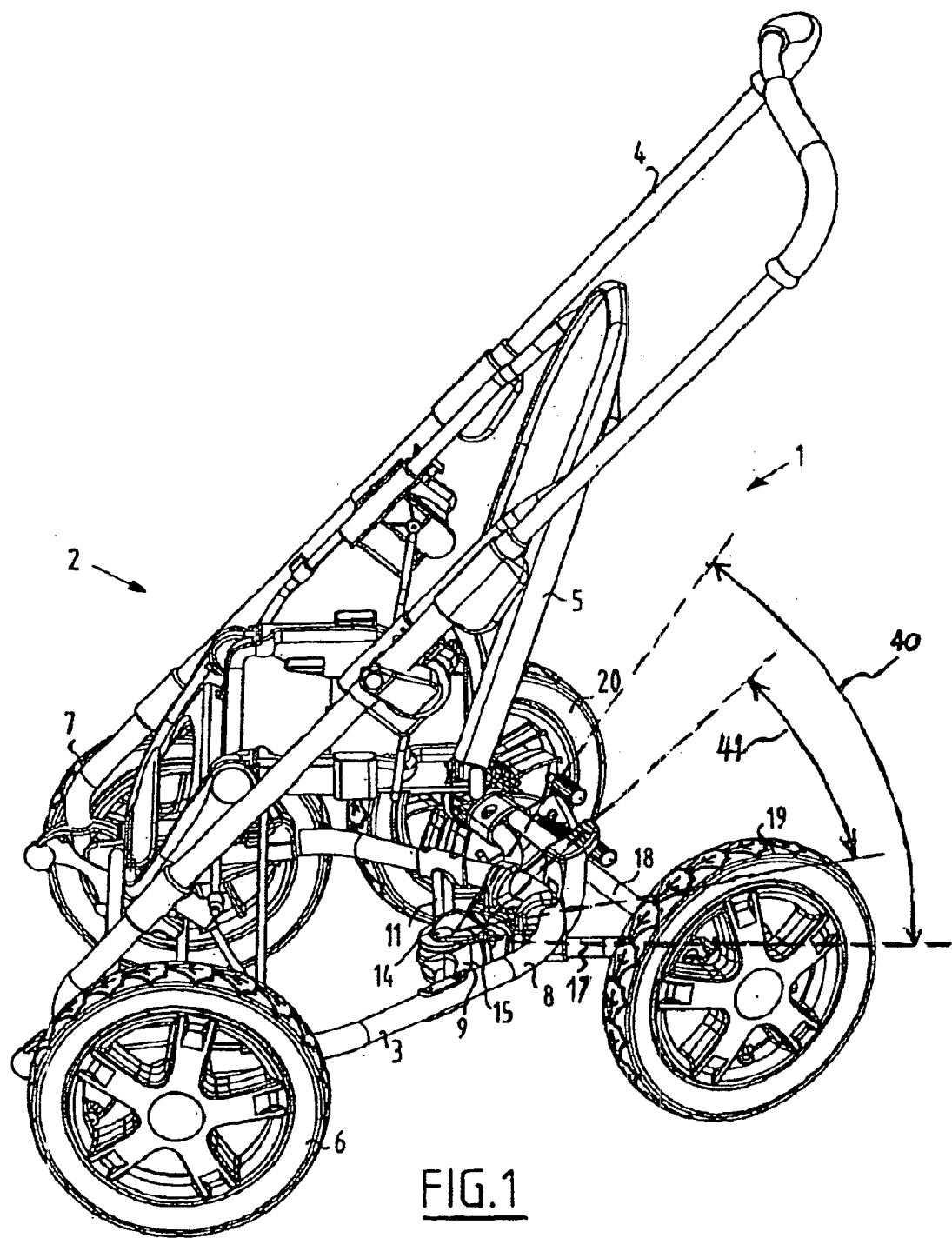
FIG. 1 is a perspective view of a pushchair according to the present invention.
Figure 2:
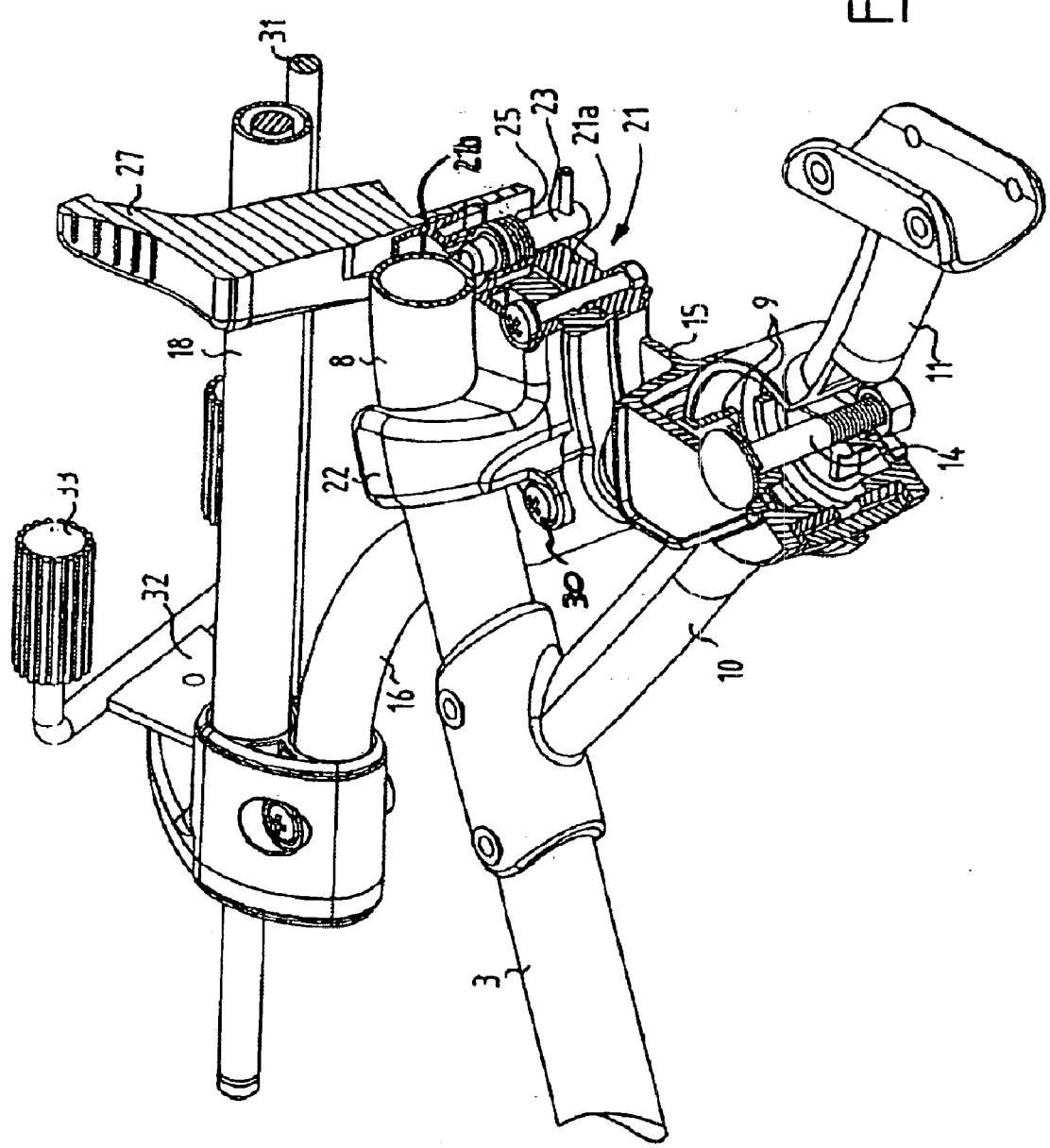
FIG. 2 is a partly broken away perspective detail view of the pushchair shown in FIG. 1.
Figure 3:
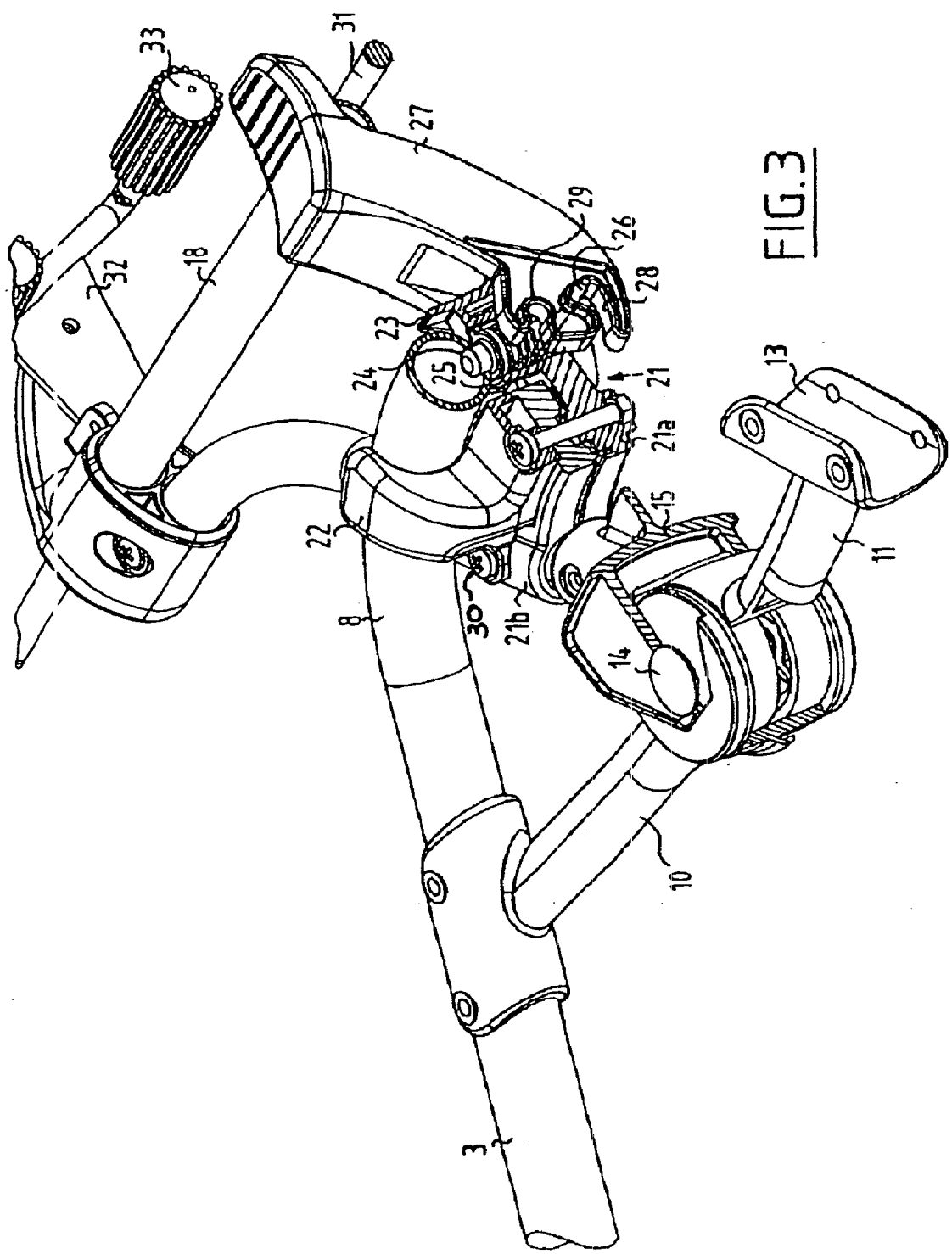
FIG. 3 shows a view corresponding with FIG. 2 in another position.

FIG. 1 shows a pushchair 1. Pushchair 1 comprises a frame 2 which is formed by a V-shaped tube part 3 to which is fastened a substantially U-shaped, obliquely extending push bracket 4. Push bracket 4 is connected to V-shaped tube part 3 by means of a folding mechanism not shown in the drawing. It is possible by means of the folding mechanism to carry the push bracket 4 to the practically horizontal position so as to reduce the volume of the pushchair. Push bracket 4 can moreover be pressed in by means of telescopic tubular parts accommodated therein.

For the further components of the frame and their functions, further reference is made to Netherlands patent application number 9400645. The components in question will not be described in full since they do not form part of the present invention.

A carrier element 5 for a child to be transported in the pushchair is further fixed to push bracket 4. The carrier element shown in FIG. 1 is formed by a seat manufactured from soft material which is suitable for transporting children from the age at which they can sit. For transport of smaller children use can be made of a different type of child carrier fastened to the V-shaped tube part, for instance a carrycot.

Wheels provided with pneumatic tires 6 are further mounted rotatably on the V-shaped tube part.

The top of V-shaped tube part 3 is embodied in the form of a bend, the central line of which extends in a circular arc. A bearing bush 9 is arranged fixedly with the V-shaped tube part in the centre of said circular arc. Bearing bush 9 is connected to V-shaped tube part 3 by means of two connecting rods 10, 11. End part 13 of connecting rod 11 connects to curved part 8.

A shaft 14 extends through bearing bush 9. On both sides of bearing bush 9 the shaft 14 is connected to an ear-shaped part 15 which is thus rotatable around shaft 14. The ear-shaped part 15 is connected to a rear shaft 18 by means of two brackets 16,17. Two wheels 19,20 are mounted on rear shaft 18. By means of the construction described up to this point a rear shaft is obtained which is pivotable relative to the whole carriage.

As a result of the fact that the rear shaft is situated a considerable distance from bearing bush 9 as seen in the direction of movement of the carriage, the bearing present in bearing bush 9 is subjected to a considerable moment. This results in an excessive load on this bearing bush 9.

In order to reduce this load a pressure part 21 is arranged between brackets 16,17. On its upper side the pressure part 21 is provided with a clamping part 22 which is in contact with the part 8 curved in circular form of V-shaped tube part 3. The combination of V-shaped tube part 3 and pressure part 21 thus acts as an additional support for the bearing. This relieves the load on the bearing.

So as to likewise not load the bearing excessively in the situation where the carriage is for instance lifted, a clamping part 22 which can slide over the upper side of V-shaped tube part 3 is connected to pressure part 21.

A pushchair is thus obtained which has good travel characteristics owing to its co-steered rear shaft. It is important here that the rotation point, formed in this case by bearing 9, is situated a considerable distance in front of rear shaft 18. In the present embodiment this distance herein amounts to about half the width of rear shaft 18. A certain measure of freedom is of course possible within this dimensioning; it is thus possible to place the bearing further to the front or further to the rear.

In some situations the steerability of rear shaft 18 is less desirable, for instance when the pushchair must be moved over an obstacle such as a curb. It is therefore possible to lock the pivoting function of the rear shaft. A locking pin 23 is arranged for this purpose in pressure part 21. Locking pin 23 is movable in substantially vertical direction. When rear shaft 18 is parallel to the front shaft, locking pin 23 is situated under a hole 24 arranged in V-shaped tube part 3. A helical spring 25 is arranged to push the pin 23 into hole 24. The above described locking device has the function that locking is obtained automatically in the right-hand position of rear shaft 18.

This locking function can be released by means of a transverse pin 26 which is connected rigidly to locking pin 23 and which extends through a hole in the locking pin. Moving this pin downward prevents locking pin 23 moving into the hole and there performing the locking function. For downward movement of transverse pin 26 a lever 27 is connected rotatably to pressure part 21, wherein lever 27 is provided with two contoured edges 28 for moving transverse pin 26 upward or downward. Lever 27 is formed such that it can be operated by foot.

For rotatable mounting and easy fitting thereof, the lever 27 is provided with two snap connections 29 which engage on shaft ends which are not shown in the drawing but which extend on either side of locking pin 23, and which are fixedly connected to pressure part 21.

It is further pointed out that, likewise for the purpose of facilitating assembly, pressure part 21 is constructed from two components 21a and 21b manufactured from plastic. These components are mutually connected by means of screws 30. The screws further extend through clamping part 22, which is thereby also connected in one operation to the pressure part. Screws 30 also serve to connect pressure part 21 to bracket 16 or bracket 17, which connect bearing 9 to rear shaft 18.

Rear shaft 18 is otherwise provided with a per se known braking device. The braking device is provided with a rod 31 which is rotatably connected to rear shaft 18 by means of two levers 32, each placed in the vicinity of one of the rear wheels. The geometry of lever 32 is formed such that shaft 31 is movable between two positions, wherein in a first position shaft 31 is situated a short distance from rear shaft 18 and engages on a braking element arranged in the rear wheels, and a second position wherein rod 31 is clear of the relevant braking element.

Lever 32 is herein provided with two operating elements 33 with which the lever can be moved between the two positions. A spring (not shown in the drawing) is further arranged for holding the rod 31 in the relevant positions.

Figure 4:
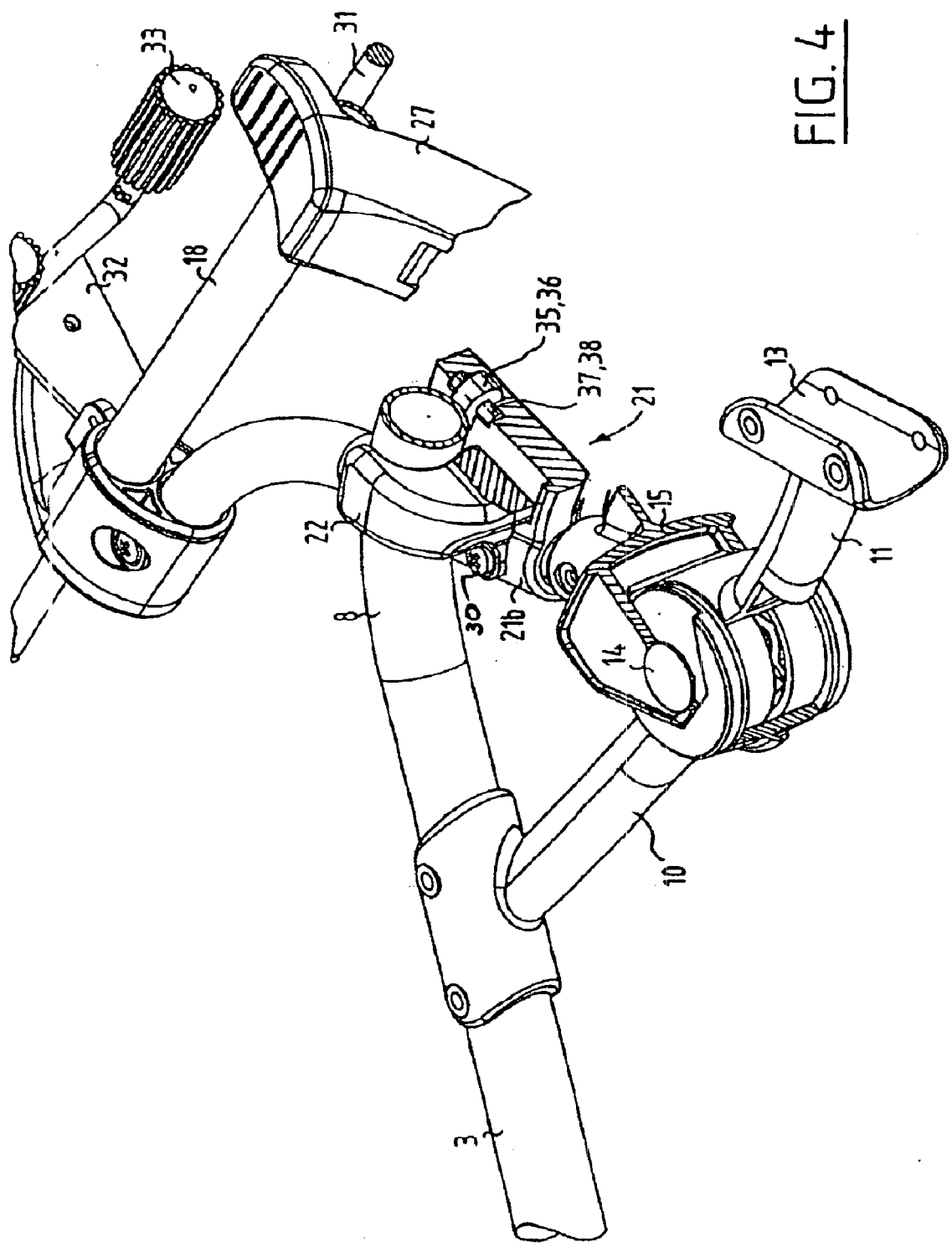
FIG. 4 shows a view corresponding with FIG. 3 of an embodiment wherein rolling bearings are arranged in the support bearing.

FIG. 4 finally shows how two rolling bearings 35, 36 of small dimensions are accommodated in pressure part 21. Bearings 35, 36 with their respective shafts 37, 38 are herein embedded in the pressure part 21 which is provided for this purpose with a recess. The recess is so large that the ring of the bearing does not come into contact with the pressure part, but only with the arcuate part 8.

In FIG. 1, angle 40 is the angle between the brackets 16 and 17 and angle 41 is the angle between the two rolling bearings.

What is claimed is:

1. A hand-propelled vehicle for passenger transport, comprising:
   a chassis with at least one fixed wheel and a sub-frame provided with at least two pivotable wheels connected by at least one shaft wherein said sub-frame is pivotally connected to a fixed part of the chassis by a pivot connection, wherein the pivotable wheels are situated behind the at least one fixed wheel as seen in a direction of travel of the vehicle, and the pivot connection to the fixed part of the chassis is situated in front of the shaft as seen in the direction of travel, wherein said sub-frame is also connected to the chassis by a slidable support bearing, which is placed between the pivotable wheels and the pivot connection.

2. The vehicle as claimed in claim 1, wherein the support bearing is provided with at least one rolling bearing which is adapted to absorb at least a part of the normal force on the pivot connection.

3. The vehicle as claimed in claim 2, wherein the support bearing is provided with two rolling bearings each bearing having an axis of rotation, wherein an angle formed between the axes is greater than 30°.

4. The vehicle as claimed in claim 1, wherein the distance between the pivot connection and the shaft is on the order of magnitude of half the distance between the pivotable wheels.

5. The vehicle as claimed in claim 1, where a rolling bearing is arranged in the pivot connection.

6. The vehicle as claimed in claim 1, further comprising at least one pressure part connected to the shaft or the fixed part of the chassis and engaging on the fixed part or the shaft.

7. The vehicle as claimed in claim 1, further comprising means for fixing the pivot connection in a determined position between the shaft and the fixed part of the chassis.

8. The vehicle as claimed in claim 7, wherein the fixing means comprises at least one movable blocking member connected to the shaft or the fixed part of the chassis and co-acting with the fixed part or the shaft, which member is biased to its blocking position.

9. The vehicle as claimed in claim 8, wherein the blocking member is a biased pin for engaging in an opening.

* * * * *